United States Patent [19]

Howell et al.

[11] Patent Number: 4,716,248

[45] Date of Patent: Dec. 29, 1987

[54] AMINOCYCLOHEXYL-SUBSTITUTED, BRANCH ALKYLAMINES

[75] Inventors: Frederick H. Howell, Atherton, England; Josef Pfeifer, Therwil, Switzerland

[73] Assignee: Ciba-Geigy Corporation, Ardsley, N.Y.

[21] Appl. No.: 660,196

[22] Filed: Oct. 12, 1984

Related U.S. Application Data

[63] Continuation of Ser. No. 388,360, Jun. 14, 1982, abandoned.

[30] Foreign Application Priority Data

Jun. 19, 1981 [GB] United Kingdom ............... 8119009

[51] Int. Cl.$^1$ .................................. C07C 101/72
[52] U.S. Cl. ............................ 564/454; 564/452; 564/460; 564/453; 564/456; 564/462; 564/457; 564/461; 564/306; 564/373; 564/428; 564/443; 564/305; 564/454; 564/451
[58] Field of Search ............ 564/452, 454, 460, 450, 564/451, 453, 456, 462, 457, 461, 306, 373, 428, 443, 305

[56] References Cited

U.S. PATENT DOCUMENTS

| | | | |
|---|---|---|---|
| 2,606,924 | 8/1952 | Whitman | 564/452 |
| 2,795,612 | 6/1957 | Luduena | 564/454 X |
| 4,293,687 | 10/1981 | Weissel et al. | 564/452 X |
| 4,503,249 | 3/1985 | Nowack et al. | 564/452 X |

*Primary Examiner*—Paul F. Shaver
*Attorney, Agent, or Firm*—Luther A. R. Hall

[57] ABSTRACT

New compounds having the formula:

$$X-(YQNH_2)_p \qquad \text{I}$$

wherein p is 1 or 2 and the residues $QNH_2$ are the same or different and each is a residue of formula:

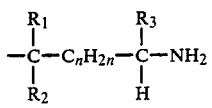

wherein n is an integer from 1 to 15; $R_1$ is $C_1$-$C_8$ alkyl; $R_2$ is $C_1$-$C_4$ alkyl; or $R_1$ and $R_2$; together with the carbon atom to which they are attached, from a $C_5$-$C_8$ cycloalkylene residue; $R_3$ is H or $C_1$-$C_6$ alkyl, $C_3$-$C_8$ cycloalkyl or $C_6$-$C_{10}$ aryl; and Y is a divalent residue of formula:

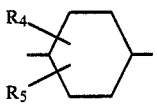

wherein $R_4$ and $R_5$ are H or $C_1$-$C_4$ alkyl or, when p is 1, the group $R_4$, together with the group X, can form a tetramethylene chain substituted by the group $QNH_2$, X is $NH_2$ or $QNH_2$ or X may be combined with $R_4$ as hereinbefore defined; and, when p is 2, X is a direct bond or a —$CH_2$— or —O— residue; as well as salts with organic or inorganic acids; and stereoisomers of formula I; and are useful as intermediates for other compounds e.g. polyamides.

12 Claims, No Drawings

AMINOCYCLOHEXYL-SUBSTITUTED, BRANCH ALKYLAMINES

This is a continuation of application, Ser. No. 388,360, filed on June 14, 1982, now abandoned.

The present invention relates to new diamines and to a process for their production.

The present invention provides compounds having the formula I $$X-(YQNH_2)_p \quad (I)$$

wherein p is 1 or 2 and the residues QNH$_2$ are the same or different and each is a residue of formula:

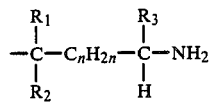

wherein n is an integer from 1 to 15, $R_1$ is $C_1$–$C_8$ alkyl, $R_2$ is $C_1$–$C_4$ alkyl or $R_1$ and $R_2$, together with the carbon atom to which they are attached, form a $C_5$–$C_8$ cycloalkylene residue, $R_3$ is H or $C_1$–$C_6$ alkyl, $C_3$–$C_8$ cycloalkyl or $C_6$–$C_{10}$ aryl and Y is a divalent cyclohexylene residue of formula

wherein $R_4$ and $R_5$ are H or $C_1$–$C_4$ alkyl or, when p is 1, the group $R_4$, together with the group X, can form a tetramethylene chain substituted by the group QNH$_2$, X is NH$_2$ or QNH$_2$, or X may be combined with $R_4$ as hereinbefore defined; and, when p is 2, X is a direct bond or a —CH$_2$— or —O— residue; as well as salts with organic or inorganic acids; and stereoisomers of compounds of formula I.

When $R_1$ is an alkyl group, it may be straight or branch chain and may be e.g. a methyl, ethyl, n-propyl, isopropyl, n-butyl, isobutyl, sec. butyl, n-amyl, n-hexyl, hept-3-yl, or n-octyl group. When $R_2$, $R_4$ and/or $R_5$ is an alkyl group, it may be straight or branch chain and may be e.g. methyl, ethyl, n-propyl, isopropyl, n-butyl, isobutyl or sec. butyl. When $R_1$ and $R_2$, together with the carbon atom to which they are attached, form a cycloalkylene chain, this may be a cyclopentylene, cyclohexylene, cycloheptylene or cyclooctylene residue. When $R_3$ is an alkyl group, it may be straight or branch chain and may be e.g. a methyl, ethyl, n-propyl, isopropyl, n-butyl, sec. butyl, amyl or hexyl group. Cycloalkyl groups $R_3$ may be e.g. cyclopropyl, cyclobutyl, cyclopentyl, cyclohexyl, cycloheptyl or cyclooctyl groups. When $R_3$ is an aryl group it may be a phenyl or naphthyl group.

Examples of salts of compounds of formula I are the hydrochloride, sulphate, nitrate, phosphate, methane sulphonate, methane phosphonate, p-toluene sulphonate, acetate, benzoate, oxalate, succinate, maleate, adipate and isophthalate salts.

Preferred compounds of formula I are those wherein p is 1; more preferred are those wherein p is 1, X is NH$_2$ and Y and QNH$_2$ have their previous significance. Especially preferred compounds of formula I are those wherein p is 1, X is NH$_2$, Y has its previous significance wherein $R_4$ and $R_5$ are H or $C_1$–$C_3$ alkyl, more particularly methyl and especially hydrogen, and QNH$_2$ has its previous significance wherein n is 1 to 15, more particularly 3, 8 or 9, $R_1$ is $C_1$–$C_6$ alkyl, particularly $C_1$–$C_4$ alkyl, especially methyl or ethyl, $R_2$ is $C_1$–$C_3$ alkyl, particularly methyl or ethyl, especially methyl and $R_3$ is $C_1$–$C_6$ alkyl, more particularly $C_1$–$C_4$ alkyl, and especially methyl or isopropyl.

Examples of compounds of formula I are
2-amino-6-(4-aminocyclohexyl)-6-methylheptane
2-amino-6-(4-amino-3-methylcyclohexyl)-6-methylheptane
2-amino-6-(4-amino-3,5-dimethylcyclohexyl)-6-methylheptane
2-amino-6-(4-amino-3-ethylcyclohexyl)-6-methylheptane
2-amino-6-(4-amino-3,5-diethylcyclohexyl)-6-methylheptane
2-amino-6-(4-amino-3-isopropylcyclohexyl)-6-methylheptane
2-amino-6-(4-amino-3,5-diisopropylcyclohexyl)-6-methylheptane
2-amino-6-(4-amino-3-sec-butylcyclohexyl)-6-methylheptane
2-amino-6-(4-amino-3,5-di-sec-butylcyclohexyl)-6-methylheptane
3-amino-12-(4-aminocyclohexyl)-2,12-dimethyl-tetradecane
3-amino-13-(4-aminocyclohexyl)-2,13-dimethyl-tetradecane
2-amino-6-(4-amino-3-methyl-5-ethylcyclohexyl)-6-methylheptane
2-amino-6-(4-amino-3-methyl-5-isopropylcyclohexyl)-6-methylheptane
2-amino-6-(4-amino-3-methyl-5-sec-butylcyclohexyl)-6-methylheptane
2-amino-6-(4-amino-3-ethyl-5-sec-butylcyclohexyl)-6-methylheptane
3-Amino-12-(4-amino-3-methylcyclohexyl)-2,12-dimethyl-tetradecane
3-Amino-13-(4-amino-3-methylcyclohexyl)-2,13-dimethyl-tetradecane
3-Amino-12-(4-amino-3,5-dimethylcyclohexyl)-2,12-dimethyl-tetradecane
3-Amino-13-(4-amino-3,5-dimethylcyclohexyl)-2,13-dimethyl-tetradecane
3-Amino-12-(4-amino-3-ethylcyclohexyl)-2,12-dimethyl-tetradecane
3-Amino-13-(4-amino-3-ethylcyclohexyl)-2,13-dimethyl-tetradecane
3-Amino-12-(4-amino-3-isopropylcyclohexyl)-2,12-dimethyl-tetradecane
3-Amino-13-(4-amino-3-isopropylcyclohexyl)-2,13-dimethyl-tetradecane
3-Amino-12-(4-amino-3-methyl-5-isopropylcyclohexyl)-2,12-dimethyl-tetradecane
3-Amino-13-(4-amino-3-methyl-5-isopropylcyclohexyl)-2,13-dimethyl-tetradecane
1-Amino-10-(4-amino-cyclohexyl)-10-methyl-1-cyclohexyl-decane
3-Amino-12-(4-amino-cyclohexyl)-12-methyl-tetradecane
3-Amino-13-(4-amino-cyclohexyl)-13-methyl-tetradecane
1-(4-Aminocyclohexyl)-1-(3-amino-dodec-12-yl)-cyclohexane
1,4-bis-(6-amino-2-methylhept-2-yl)cyclohexane 4,4'''-bis-(6-amino-2-methylhept-2-yl)-bicyclohexyl
1,4-bis-(12-amino-3,13-dimethyltetradec-3-yl)cyclohexane
1,4-bis-(12-amino-2,13-dimethyltetradec-2-yl)-cyclohexane
1-(12-amino-3,13-dimethyltetradec-3-yl)-4-(12-amino-2,13-dimethyltetradec-2-yl)-cyclohexane
4,4'-bis-(6-amino-2-methylhept-2-yl)-dicyclohexylmethane
4,4'-bis-(6-amino-2-methylhept-2-yl)-dicyclohexylether
2,6-bis-(6-amino-2-methylhept-2-yl)-decalin
2,7-bis(6-amino-2-methylhept-2-yl)-decalin Preferred compounds of formula I are:
cis-2-amino-6-(4-aminocyclohexyl)-6-methylheptane
trans-2-amino-6-(4-aminocyclohexyl)-6-methylheptane
cis and trans 3-amino-12-(4-aminocyclohexyl)-2,12-dimethyltetradecane
cis and trans 3-amino-13-(4-aminocyclohexyl)-2,13-dimethyltetradecane
2-amino-6-(4-amino-3-methylcyclohexyl)-6-methylheptane
2-amino-6-(4-amino-3,5-dimethylcyclohexyl)-6-methylheptane
2-amino-6-(4-amino-3-ethylcyclohexyl)-6-methylheptane
2-amino-6-(4-amino-3-isopropylcyclohexyl)-6-methylheptane
4,4'-bis-(6-amino-2-methylhept-2-yl)-bicyclohexyl.

According to the present invention, there is also provided a process of producing compounds of formula I comprising hydrogenating a compound having the formula II or IIa:

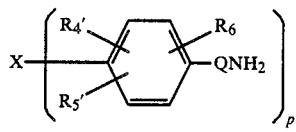

or

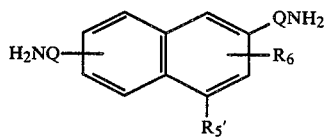

wherein $QNH_2$ and p have their previous significance; and when p is 1, X is $NH_2$ or $QNH_2$ and, when p is 2, X is a direct bond or is $-CH_2-$ or $-O-$, and $R_4'$ and $R_5'$ are the same or different and each is H, $C_1-C_4$ alkyl or chlorine, and $R_6$ is H or chlorine, provided that only one of the groups $R_4'$, $R_5'$ and $R_6$ is chlorine, in the presence of a metal-, or mixed metal catalyst, and in the presence of a solvent which is inert to hydrogen under the reaction conditions. In the course of the reduction of compounds of formula II or IIa in which one of the groups $R_4'$, $R_5'$ or $R_6$ is chlorine, this chlorine atom is replaced by a hydrogen atom.

Compounds having the formula II wherein p is 1 and X is $NH_2$ can be prepared by reacting the corresponding aromatic amine with the corresponding alkylating agent in an aqueous acid medium containing at least 30% by weight of water or by effecting the reaction at atmospheric pressure in the temperature range of from 100°-200° C., preferably from 170°-190° C.; this temperature range is achieved when working at atmospheric pressure, by removing distillatively the water present.

Compounds of formula II wherein p is 1 or 2 and, when p is 1, then X is $QNH_2$ and (b) compounds of formula IIa by reacting, at a temperature in the range of from 0° to 150° C., in the presence of a Friedel-Crafts catalyst, a compound having the formula $R_7Z_x$ wherein $R_7$ is a mon- or polyvalent $C_6-C_{20}$ aromatic residue, Z is a replaceable hydrogen atom and X is 1 or 2, with an amino-alcohol or amino-olefin, or a salt thereof with an organic or inorganic acid, capable of replacing an H atom in $R_7Z_x$ by a group of formula:

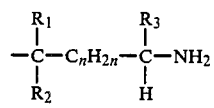

wherein $R_1$, $R_2$, $R_3$ and n have their previous significance.

The reaction solvent used in the present process may be e.g. an alcohol, a carboxylic acid or an aqueous inorganic acid. Acetic acid and hydrochloric acid are particularly suitable. When aqueous hydrochloric is used, 1 equivalent of HCl is used per amino group, and additionally there may be present up to a further 2 equivalents excess over those required for neutralisation.

When using solvents such as t-butanol, higher temperatures such as those up to 160° C. may be employed; however, when using hydrochloric acid or acetic acid, the hydrogenation is conveniently effected at room temperature.

Reaction pressures between atmospheric and 200 atmospheres may be used and pressures between 1 and 5 atmospheres are especially suitable when using hydrochloric acid as solvent.

Group VIII metals of the periodic system of elements, e.g. Rh and Pt, or mixtures thereof optionally containing other metals, e.g. Al; or their oxides, are suitable as hydrogenation catalysts. More preferred is $Rh/Al_2O_3$ when using tert.butanol solvent, and especially preferred is a mixture $Rh_2O_3$-$PtO_2$ (Nishimura catalyst; Shigeo Nishimura and Hisaaki Taguchi, Bull. Soc. Chem. Japan 36 (7), 873-5 (1963)) when using hydrochloric acid as solvent.

The solution containing the reduced compound of formula I may be separated from the catalyst by filtration. When organic solvents are used, these may be stripped off and the compound of formula I may be then isolated by distillation under reduced pressure. For hydrogenations in which hydrochloric acid is used as solvent, the filtered reaction mixture may be neutralised with a base such as sodium hydroxide and then isolated e.g. by extraction with ether and then distillation. Examples of compounds of formula II or IIa include:
2-amino-6-(4-aminophenyl)-6-methylheptane
1-amino-11-(4-aminophenyl)-2,11-dimethyldodecane
3-amino-12-(4-aminophenyl)-2,12-dimethyl-tetradecane
3-amino-13-(4-aminophenyl)-2,13-dimethyl-tetradecane
2-amino-6-(4-amino-3-methylphenyl)-6-methylheptane
2-amino-6-(4-amino-3,5-dimethylphenyl)-6-methylheptane
2-amino-6-(4-amino-3-methylphenyl)-6-methylheptane 2-amino-6-(4-amino-3,5-diethylphenyl)-6-methylheptane
2-amino-6-(4-amino-3-isopropylphenyl)-6-methylheptane
2-amino-6-(4-amino-3,5-diisopropylphenyl)-6-methylheptane
2-amino-6-(4-amino-3-sec-butylphenyl)-6-methylheptane
2-amino-6-(4-amino-3-methyl-5-ethylphenyl)-6-methylheptane
2-amino-6-(4-amino-3-methyl-5-isopropylphenyl)-6-methylheptane
2-amino-6-(4-amino-3-methyl-5-sec-butylphenyl)-6-methylheptane
2-amino-6-(4-amino-3-ethyl-5-sec-butylphenyl)-6-methylheptane
2-amino-6-(4-amino-4-chlorophenyl)-6-methylheptane
2-amino-6-(4-amino-3,5-dichlorophenyl)-6-methylheptane
2-amino-6-(4-amino-3-chloro-5-methylphenyl)-6-methylheptane
3-Amino-12-(4-amino-3-methylphenyl)-2,12-dimethyl-tetradecane
3-Amino-13-(4-amino-3-methylphenyl)-2,13-dimethyl-tetradecane
3-Amino-12-(4-amino-3,5-dimethylphenyl)-2,12-dimethyl-tetradecane
3-Amino-13-(4-amino-3,5-dimethylphenyl)-2,13-dimethyl-tetradecane
3-Amino-12-(4-amino-3-ethylphenyl)-2,12-dimethyl-tetradecane
3-Amino-13-(4-amino-3-ethylphenyl)-2,13-dimethyl-tetradecane
3-Amino-12-(4-amino-3-isopropylphenyl)-2,12-dimethyl-tetradecane
3-Amino-13-(4-amino-3-isopropylphenyl)-2,13-dimethyl-tetradecane
3-Amino-12-(4-amino-3-methyl-5-isopropylphenyl)-2,12-dimethyl-tetradecane
3-Amino-13-(4-amino-3-methyl-5-isopropylphenyl)-2,13-dimethyl-tetradecane
1-Amino-10-(4-aminophenyl)-10-methyl-1-phenyl-decane
3-Amino-12-(4-aminophenyl)-12-methyl-tetradecane
3-Amino-13-(4-aminophenyl)-13-methyl-tetradecane
1-(4-Aminophenyl)-1-(3-amino-dodec-12-yl)-cyclohexane
1,4-bis-(6-amino-2-methylhept-2-yl)-benzene
4,4'-bis-(6-amino-2-methylhept-2-yl)-diphenyl
1,4-bis-(12-amino-3,13-dimethyltetradec-3-yl)-benzene
1,4-bis-(12-amino-2,13-dimethyltetradec-2-yl)-benzene
1-(12-amino-3,13-dimethyltetradec-3-yl)-4-(12-amino-2,13-dimethyltetradec-2-yl)-benzene
4,4'-bis-(6-amino-2-methylhept-2-yl)-diphenylmethane
4,4'-bis(6-amino-2-methylhept-2-yl)-diphenylether
2,6-bis-(6-amino-2-methylhept-2-yl)-naphthalene
2,7-bis-(6-amino-2-methylhept-2-yl)-naphthalene
4-(6-amino-2-methylhept-2-yl)-4'-(12-amino-2,13-dimethyltetradec-2-yl)-diphenylether.

The compounds of formula I produced by the process of the present invention can give rise to one or more stereoisomeric products, the number of which is dependent upon the nature of the groups $R_4$, $R_5$ and $QNH_2$. For example, when p is 1, X is $NH_2$, $R_4$ and $R_5$ are H and $QNH_2$ is aminoalkyl, two isomers, namely the cis and trans isomers, may be produced having the formulae (III) and (IV) respectively:

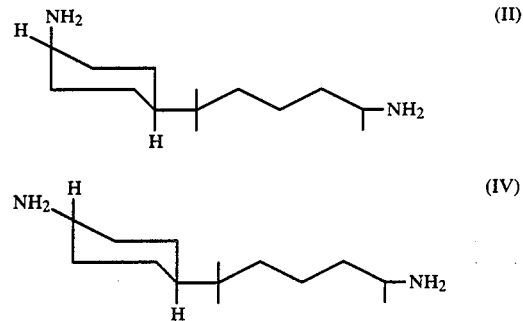

Examples of such stereoisomers are:
cis-2-amino-6-(4-aminocyclohexyl)-6-methylheptane
trans-2-amino-6-(4-aminocyclohexyl)-6-methylheptane
cis and trans 1-amino-11-(4-aminocyclohexyl)-2,11-dimethyldodecane
cis and trans 3-amino-2,12-dimethyl-12-(4-aminocyclohexyl)-tetradecane
cis and trans 3-amino-2,13-dimethyl-13-(4-aminocyclohexyl)-tetradecane The compounds of formula I are useful as intermediates for other compounds e.g. in the production of new transparent polyamides, and which are distinguished by improved thermoplastic processing characteristics, are resistant to boiling water and which further have a low water absorption, high stability to hydrolysis, good dimensional stability under the action of moisture, and correspondingly improved mechanical and electrical properties.

The novel polyamides have a reduced specific viscosity of at least 0.3 dl/g, preferably about 0.5 to about 2.0 dl/g, and particularly about 0.7 to about 1.8 dl/g, measured on a 0.5% solution in m-cresol at 25° C., and they consist of recurring structural elements of formula V

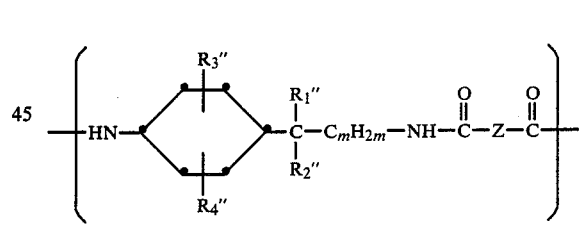

wherein
m is an integer of from 4 to 16
$R_1''$ is $C_{1-3}$ alkyl
$R_2''$ is $C_{1-6}$ alkyl
$R_3''$ and $R_4''$ independently of each other are hydrogen or $C_{1-3}$ alkyl, and Z is 1, 3- and/or 1,4-phenylene which, in up to 50 mole%, preferably up to 45 mole%, of the structural elements of formula V may be replaced by groups $-(CH_2)_k$ wherein k is an integer of from 4 to 10, and whereby the carbonyl groups in the structural elements of formula I are linked to the benzene ring in 1,3- and/or 1,4-position.

The following Examples further illustrate the present invention. Parts and percentages shown therein are by weight. Pressures shown therein are expressed in millibars, and temperatures are in degrees Centigrade.

EXAMPLE 1

(A) 5.0 Parts of 2-amino-6-(4-aminophenyl)-6-methylheptane dissolved in 68 parts of 1N aqueous hydrochloric acid were shaken at room temperature and atmospheric pressure with hydrogen in the presence of 0.5 parts of Nishimura catalyst (rhodium-platinum oxides). Hydrogen uptake ceased at 105% of theory and the solution was filtered free of catalyst and treated with sodium hydroxide solution to give an oil which was isolated with ether. After removing the ether the residue was distilled to give 4.0 parts of cis and trans-2-amino-6-(4-aminocyclohexyl)-6-methyl-heptane $b_{0.3}$ 120°–9° with the following percentage composition by weight.

|  | Carbon | Hydrogen | Nitrogen |
|---|---|---|---|
| Found | 74.62 | 13.52 | 12.54% |
| Calculated for $C_{14}H_{30}N_2$ | 74.27 | 13.36 | 12.37% |

(B) The 2-amino-6-(4-aminophenyl)-6-methylheptane starting material was prepared as follows:

To a solution of 102 parts of anhydrous zinc chloride in 153 parts of 36% w/w aqueous hydrochloric acid and 200 parts of water were added 140 parts of aniline and 136 parts of 6-hydroxy-6-methyl-2-heptylamine hydrochloride(heptaminol hydrochloride). The whole was charged to a 1 liter tantalum lined autoclave and stirred at 185° C. for 24 hours. The reaction mixture, after being discharged from the autoclave, was added to a hot solution of 750 parts sodium hydroxide in 1500 parts of water and stirred until cool. The organic phase was ether extracted, washed with water, evaporated and distilled under reduced pressure. After recovering 58 parts of aniline there was then obtained 135 parts of 2-amino-6-(4-aminophenyl)-6-methyl-heptane $b_{0.7}$ 138°–40° (82% yield based on heptaminol) with the following percentage composition by weight.

|  | Carbon | Hydrogen | Nitrogen |
|---|---|---|---|
| Found | 76.36 | 11.27 | 13.01 |
| Calculated for $C_{14}H_{24}N_2$ | 76.31 | 10.98 | 12.71 |

EXAMPLE 2

5.1 Parts of 2-amino-6-(4-amino-3-chlorophenyl)-6-methylheptane were hydrogenated and worked up to the procedure of Example 1 using 60 parts of 1N aqueous hydrochloric acid and 1.0 parts of Nishimura catalyst. The hydrogenation, which ceased after 48 hours and which represented a 126% theory uptake, gave on distillation 4.0 parts of cis and trans 2-amino-6-(4-aminocyclohexyl)-6-methylheptane $b_{16}$ 160°–5°. Spectroscopic analysis showed that the ratio of cis and trans isomers was 3 to 1 parts respectively.

In a manner similar to that described in Example 1(B), but using 2-chloroaniline instead of aniline, there was prepared 2-amino-6-(4-amino-3-chlorophenyl)-6-methyl-heptane, $b_{13}$ 192°–7°, molecular formula $C_{14}H_{23}ClN_2$ and elemental analysis: Found: C 66.15; H 9.43; N 12.70. Required: C 65.99; H 9.10; N 10.99.

EXAMPLE 3

2-Amino-6-(4-amino-3-methylcyclohexyl)-6-methylheptane $b_{16}$ 170°–2° was prepared from 2-amino-6-(4-amino-3-methylphenyl)-6-methyl-heptane by hydrogenation over Nishimura catalyst according to the procedure of Example 1 and had the following percentage composition by weight.

|  | Carbon | Hydrogen | Nitrogen |
|---|---|---|---|
| Found | 75.03 | 13.26 | 11,33% |
| Calculated for $C_{15}H_{32}N_2$ | 74.93 | 13.42 | 11,65% |

In a manner similar to that described in Example 1(B), but using o-toluidine instead of aniline, there was prepared 2-amino-6-(4-amino-3-methylphenyl)-6-methyl-heptane $b_{13}$ 192°–6°, molecular formula $C_{15}H_{26}N_2$ and elemental analysis: Found: C 76.87; H 11.18; N 11.95. Required C 76.56; H 11.49; N 12.25.

EXAMPLE 4

Method A

2-Amino-6-(4-amino-3,5-dimethylcyclohexyl)-6-methylheptane $b_{16}$ 170°–2° was obtained from 2-amino-6-(4-amino-3,5-dimethylphenyl)-6-methylheptane following hydrogenation over Nishimura catalyst according to the procedure of Example 1 and had the following percentage composition by weight.

|  | Carbon | Hydrogen | Nitrogen |
|---|---|---|---|
| Found | 74.77 | 14.36 | 11,48% |
| Calculated for $C_{16}H_{34}N_2$ | 75.52 | 13.47 | 11,01% |

EXAMPLE 4

Method B

10 Parts of 2-amino-6-(4-amino-3,5-dimethylphenyl)-6-methylheptane, 90 parts of glacial acetic acid, 8.2 parts of 36% w/w hydrochloric acid and 1.0 part of Nishimura catalyst were charged to a glass pressure bottle. The mixture was shaken at 80° C. with hydrogen at a pressure of 4 bar, and the uptake of hydrogen stopped at 100% of theory after 1.25 hours. After removal of the catalyst by filtration the solution was poured into 200 parts of ice and the pH of the solution then adjusted to 13. The organic phase was ether extracted, evaporated and distilled to give 1.5 part of a fore-run, followed by 5.4 parts of 2-amino-6-(4-amino-3,5-dimethylcyclohexyl)-6-methylheptane $b_{0.05}$ 84°–7° C. with the following percentage composition by weight.

|  | Carbon | Hydrogen | Nitrogen |
|---|---|---|---|
| Found | 75.2 | 13.5 | 10.9 |
| calculated for $C_{16}H_{34}N_2$ | 75.52 | 13.47 | 11.01 |

EXAMPLE 4

Method C

58 Parts of 2-amino-6-(4-amino-3,5-dimethylphenyl)-6-methylheptane, 640 parts of tert-butanol, and 12 parts of 5% $Rh/Al_2O_2$ were heated in an autoclave at 150°–60° C. with hydrogen at a pressure of 200 bar. After 15 hours hydrogen uptake was complete and the reaction mixture was then filtered free of catalyst. Distillation of the filtrate after removal of the tert-butanol gave 47 parts of 2-amino-6-(4-amino-3,5-dimethylcyclohexyl)-6-methylheptane $b_{0.2}$ 116°–8° C.

In a manner similar to that described in Example 1(B), but using 2,6-dimethylaniline instead of aniline, there was prepared 2-amino-6-(4-amino-3,5-dimethylphenyl)-6-methylheptane, $b_{0.07}$ 126°–30°.

Molecular formula $C_{16}H_{28}N_2$ and elemental analysis: Found C 77.11; H 11.06; N 11.28. Required C77.36; H 11.36; N 11.28.

EXAMPLE 5

10.0 Parts of 2-amino-6-(4-amino-3-ethylphenyl)-6-methylheptane in 120 parts of 1N aqueous hydrochloric acid were shaken with hydrogen at room temperature and atmospheric pressure with 1.0 parts Nishimura catalyst. After 46% of theory hydrogen had been taken up in 18 hours a further 1.0 parts of catalyst was added and 96% of theory hydrogen uptake was reached in the next 15 hours. The hydrogenation which ceased at 110% theory during the next 24 hours following a final 1.0 part catalyst addition, was worked up according to Example 1, and gave on distillation 8.8 parts of 2-amino-6-(4-amino-3-ethylcyclohexyl)-6-methylheptane $b_{12}$ 176°–80° with the following percentage composition by weight.

|  | Carbon | Hydrogen | Nitrogen |
|---|---|---|---|
| Found | 75.38 | 13.74 | 11.11% |
| Calculated for $C_{16}H_{34}N_2$ | 75.52 | 13.47 | 11.01% |

In a manner similar to that described in Example 1(B), but using 2-ethylaniline instead of aniline, there was prepared 2-amino-6-(4-amino-3-ethylphenyl)-6-methylheptane, $b_{13}$ 188°–94°, molecular formula $C_{16}H_{28}N_2$ and elemental analysis: Found: C 77.36; H 11.78; N 10.96. Required: C 77.36; H 11.36; N 11.28.

EXAMPLE 6

5.2 Parts of 2-amino-6-(4-amino-3-isopropylphenyl)-6-methylheptane in 61 parts of 1N aqueous hydrochloric acid were hydrogenated at room temperature and atmospheric pressure using 1.0 parts of Nishimura catalyst. Thereafter at 7 and 24 hours respectively further 1.0 and 0.5 part additions of catalyst was made and the hydrogenation was complete after 46 hours with a 103% theory uptake. The work up followed Example 1, and gave, on distillation, 4.2 parts 2-amino-6-(4-amino-3-isopropylcyclohexyl)-6-methylheptane $b_{12}$ 182°–4° with the following percentage composition by weight.

|  | Carbon | Hydrogen | Nitrogen |
|---|---|---|---|
| Found | 75.98 | 13.65 | 10.15% |
| Calculated for $C_{17}H_{36}N_2$ | 76.05 | 13.52 | 10.43% |

In a manner similar to that described in Example 1(B), but using 2-isopropylaniline instead of aniline there was prepared 2-amino-6-(4-amino-3-isopropylphenyl)-6-methylheptane, $b_{16}$ 190°–8°, molecular formula $C_{17}H_{30}N_2$; and elemental analysis: Found: C 78,07; H 11,76; N 10,67. Required: C 77,80; H 11,52; N 10,67.

EXAMPLE 7

5.0 parts of a mixture of 3-amino-12-(4-aminophenyl)-2,12-dimethyl-tetradecane and 3-amino-13-(4-aminophenyl)-2,13-dimethyltetradecane in 60 ml 1N aqueous hydrochloric acid, were shaken at room temperature and atmospheric pressure in the presence of 1.0 parts of Nishimura catalyst. After the hydrogen uptaken had ceased at 118% of the theory, the solution was made alkaline with caustic soda. The work up was completed after an ether extraction, filtration, and short path distillation, giving 3.4 parts of 3-amino-12-(4-aminocyclohexyl)-2,12-dimethyltetradecane and 3-amino-13-(4-aminocyclohexyl)-2,13-dimethyltetradecane, $b_{0.3}$ 190°.

The starting material, viz, a mixture of 3-amino-12-(4-aminophenyl)-2,12-dimethyl-tetradecane and 3-amino-13-(4-aminophenyl)-2,13-dimethyl-tetradecane was prepares as follows: 123 parts of aniline and 84 parts of 11-amino-2,2,12-trimethyl-tridecan-1-ol were dissolved in a solution comprising 166 parts of 36% w/w aqueous hydrochloric acid, 89 parts anhydrous zinc chloride and 130 parts of water. This solution was then stirred at 180° for 90 hours in a 1 liter tantalum autoclave and then worked up as in Example 1 after pouring the reaction mixture into 250 parts of sodium hydroxide in 500 parts of water. Distillation under reduced pressure gave 85 parts of a first fraction which consisted mainly of aniline. This was followed by a mixture of 62 parts of 3-amino-12-(4-aminophenyl)-2,12-dimethyl tetradecane and 3-amino-13-(4-aminophenyl)-2,13-dimethyltetradecane $b_{0.13}$ 184°–8° (57% yield based on the aminotridecanol) which had the following percentage composition by weight.

|  | Carbon | Hydrogen | Nitrogen |
|---|---|---|---|
| Found | 79.19 | 12.40 | 8.46 |
| Calculated for $C_{22}H_{40}N_2$ | 79.45 | 12.12 | 8.43 |

EXAMPLE 8

5.66 g (0.025 moles) of the product of Example 1A (2-amino-6-(4-aminocyclohexyl)-6-methyl-heptane) and 4.155 g (0.025 moles) of isophthalic acid are weighed into a bomb tube fitted with a screw cover and with an incorporated pressure relief valve.

After the air in the bomb has been completely expelled by nitrogen, the bomb tube is closed. It is then immersed into a salt bath having a temperature of 270° C. A clear melt has formed after a short time. After two hours, the reaction is interrupted by removing the tube from the salt bath and releasing the excess pressure by opening the valve. The pre-condensate, which has solidified, is removed from the tube and transferred to a condensation vessel. With the strict exclusion of air and the continuous passing through of nitrogen, the mass, which has melted again, is polycondensed at 280° C. The water which forms during the polycondensation is continuously removed by the flow of nitrogen. After 5 hours the polycondensation is interrupted. On cooling, the melt solidifies into a transparent colourless mass.

2 to 3 g of the polyamide thus obtained are then moulded into an about 0.3 to 0.5 mm thick sheet by means of a heatable hydraulic press. The sheet is exposed at room temperature to a relative humidity of 65% until no further increase in weight can be detected. The reduced viscosity of the polyamide is measured on a 0.5% solution in m-cresol at 25° C. and is 1.39 dl/g; its glass transition temperature is determined in a differential calorimeter (DSC) and is 174° C.

What is claimed is:

1. A compound having the formula I

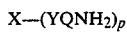   (I)

wherein p is 1 or 2 and the residues QNH$_2$ are the same or different and each is a residue of formula:

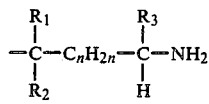

wherein n is an integer from 1 to 15; R$_1$ is C$_1$–C$_8$ alkyl; R$_2$ is C$_1$–C$_4$ alkyl; or R$_1$ and R$_2$, together with the carbon atom to which they are attached, form a C$_5$–C$_8$ cycloalkylene residue; R$_3$ is H or C$_1$–C$_6$ alkyl, C$_3$–C$_8$ cycloalkyl or C$_6$–C$_{10}$ aryl; and Y is a divalent cyclohexylene residue of formula:

wherein R$_4$ and R$_5$ are H or C$_1$–C$_4$ alkyl or, when p is 1, the group R$_4$, together with the group X, can form a tetramethylene chain substituted by the group QNH$_2$, X is NH$_2$ or QNH$_2$ or X may be combined with R$_4$ as hereinbefore defined; and, when p is 2, X is a direct bond or a —CH$_2$— or —O— residue; as well as salts with organic or inorganic acids; and stereoisomers of formula I.

2. A compound of formula I according to claim 1 wherein p is 1 and X, Y and QNH$_2$ are as defined in claim 1.

3. A compound of formula I according to claim 1 wherein p is 1, X is NH$_2$, Y is as defined in claim 1 wherein R$_4$ and R$_5$ are H or C$_1$–C$_3$ alkyl and QNH$_2$ is as defined in claim 1 wherein R$_1$ is C$_1$–C$_6$ alkyl, R$_2$ is C$_1$–C$_3$ alkyl and R$_3$ is C$_1$–C$_6$-alkyl.

4. A compound of formula I according to claim 3 wherein R$_4$ and R$_5$ are methyl or H, n is 3, 8 or 9, R$_1$ is C$_1$–C$_4$ alkyl, R$_2$ is methyl or ethyl and R$_3$ is C$_1$–C$_4$ alkyl.

5. A compound according to claim 1, which is 2-amino-6-(4-aminocyclohexyl)-6-methylheptane.

6. A compound according to claim 1, which is 2-amino-6-(4-amino-3-methylcyclohexyl)-6-methylheptane.

7. A compound according to claim 1, which is 2-amino-6-(4-amino-3,5-dimethylcyclohexyl)-6-methylheptane.

8. A compound according to claim 1, which is 2-amino-6-(4-amino-3-ethylcyclohexyl)-6-methylheptane.

9. A compound according to claim 1, which is 2-amino-6-(4-amino-3-isopropylcyclohexyl)-6-methylheptane.

10. A compound according to claim 1, which is 3-amino-12-(4-aminocyclohexyl)-2,12-dimethyl-tetradecane.

11. A compound according to claim 1, which is 3-amino-13-(4-aminocyclohexyl)-2,13-dimethyl-tetradecane.

12. A compound according to claim 1, which is 4,4'-bis-(6-amino-2-methylhept-2-yl)-bicyclohexyl.

* * * * *